UNITED STATES PATENT OFFICE.

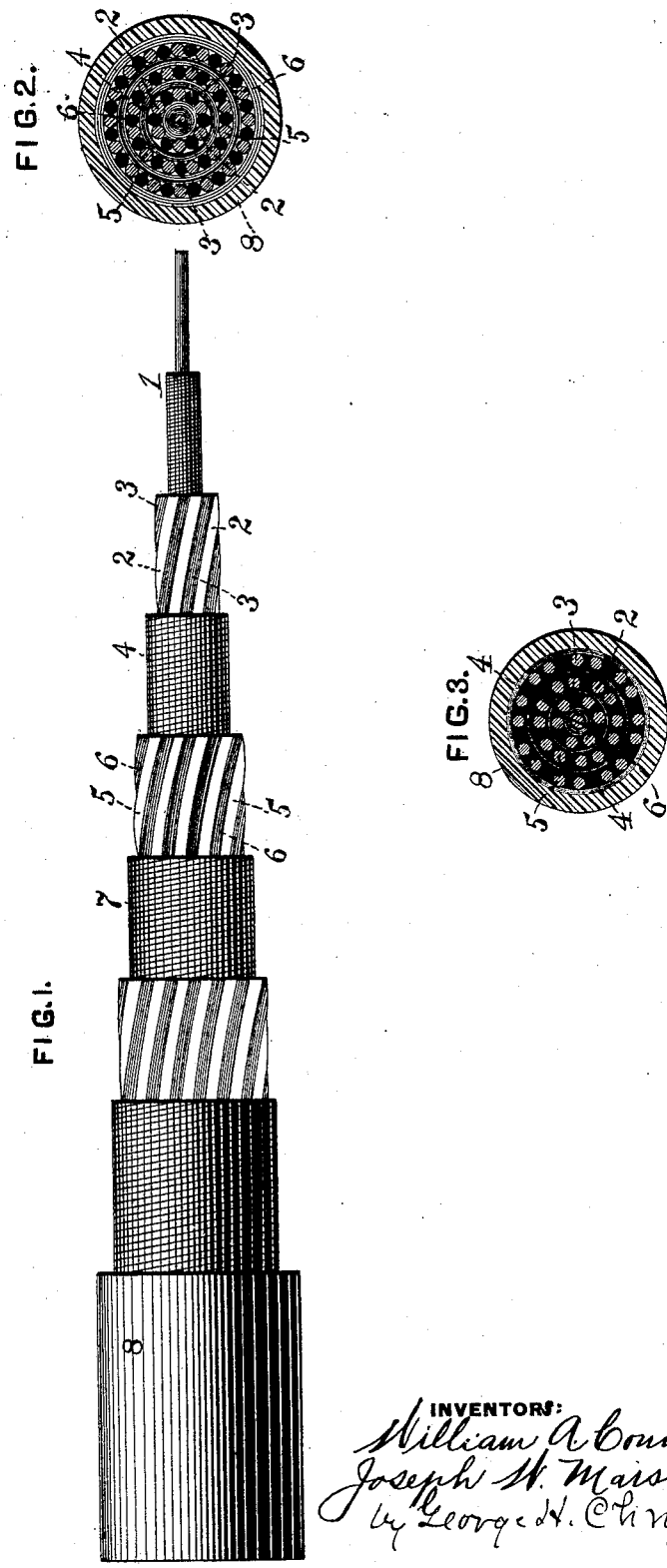

WILLIAM A. CONNER AND JOSEPH W. MARSH, OF PITTSBURG, PENNSYLVANIA, ASSIGNORS TO THE STANDARD UNDERGROUND CABLE COMPANY, OF SAME PLACE.

ELECTRIC CABLE.

SPECIFICATION forming part of Letters Patent No. 466,268, dated December 29, 1891.

Application filed February 10, 1890. Serial No. 339,809. (No model.)

*To all whom it may concern:*

Be it known that we, WILLIAM A. CONNER and JOSEPH W. MARSH, citizens of the United States, residing at Pittsburg, in the county of Allegheny and State of Pennsylvania, have invented or discovered a certain new and useful Improvement in Electric Cables, of which improvement the following is a specification.

The invention described herein relates to certain improvements in electric cables. It is necessary in the manufacture of electric cables that the wires or conductors should be separated by a certain thickness of insulation in order to prevent leakage from one to another adjacent thereto. This end has heretofore been attained by first fully insulating each conductor—that is to say, surrounding each with insulation having a thickness equal to half the thickness of insulation required between adjacent wires. The wires thus insulated were then laid up into a cable by a suitable twisting or stranding machine. This separate insulation of each conductor and the subsequent twisting of the conductors to form the cable greatly increases the expense and labor of manufacture, and the cable so made is less pliable than desired.

The object of this invention is to so arrange the wires thereof as to maintain proper insulation and yet render the cable more flexible and reduce the cost of manufacture; and it is a further object of said invention to so arrange the wires that when employed in pairs as a metallic circuit the members of such pairs shall be separated a sufficient distance to overcome any retardation of current, and this without any undue increase in the size of the cable.

In the accompanying drawings, forming a part of this specification, Figure 1 is a view in elevation of a cable embodying our invention, parts being removed to illustrate the cable at different stages of manufacture. Fig. 2 is a transverse sectional view of the cable, and Fig. 3 is a similar view of a modified form of the cable.

The central core 1 may be formed of a wire or conductor fully insulated, as shown in Fig. 2, or may be formed of a strand of fiber of non-conducting material. Around this central core are placed a series of wires 2, either entirely bare or only thinly or indifferently covered with insulating material. A strand or strip 3 of fibrous or other non-conducting material is interposed between adjacent wires, said strand or strip having a diameter equal to the thickness of insulating material required between wires in the same layer. The wires 2 and alternating non-conducting material is preferably arranged spirally around the core 1 in a manner similar to laying up the strands of a wire rope. The wires and non-conducting material are bound in place by a layer 4 of non-conducting material, preferably formed by wrapping or braiding a fibrous material around them. This layer 4 should also be made of a thickness equal to the thickness of insulation required between adjacent conductors, so that the wires 2 of the first layer may be separated the desired distance from the wires of the next layer. Upon the wrapping or layer 4 of insulating material is arranged in proper alternation another series of wires 5 and strands 6 of non-conducting material, as described, for the formation of the first series. This second series of alternating wires and non-conducting strands are bound in place by a wrapping or braiding 7 of fibrous material of a thickness approximately equal to that of the layer 4. Upon this second layer of non-conducting material may be placed a third series of alternating wires and insulating-strands, which are similarly covered with a third layer of non-conducting material, and these operations continued until the desired number of conductors have been incorporated in the cable. The last layer of non-conducting material may or may not be covered with a sheathing 8, of lead or other suitable material, in accordance with the use to which the cable is to be used.

When metallic circuits are employed, it is customary to employ adjacent conductors for such circuits, so as to avoid confusion in making connections, and it is desirable that the wires forming the circuit should be separated a greater distance from each other than adjacent wires of adjoining circuits. Hence in the manufacture of this class of cable the strand of non-conducting material interposed between the conductors forming the circuit is made somewhat wider than the strands interposed between adjacent wires of independent circuits, as shown in Fig. 3. In this form of cable the layer 4, separating the several layers or series of wires, is made of a thickness equal to the thickness of strands separating adjacent circuits.

It will be readily understood that a cable constructed as described will require less labor and time in its construction and the insulation of the conductors and the "laying up" or arrangement thereof into the form of a cable be effected simultaneously.

We claim herein as our invention—

An electric cable having a series of conductors adapted to be used in pairs for metallic circuits, the two wires of a pair or circuit being separated from each other a greater distance than the adjacent wires of adjoining circuits, substantially as set forth.

In testimony whereof we have hereunto set our hands.

WILLIAM A. CONNER.
JOSEPH W. MARSH.

Witnesses for William A. Conner:
 LE ROY VERMILYEA,
 JAMES E. MUSSEY.
Witnesses for Joseph W. Marsh:
 J. STANTON LUTTON,
 C. M. HAGEN.